United States Patent [19]

Anderson

[11] 4,005,542
[45] Feb. 1, 1977

[54] HUMANE ANIMAL TRAP
[76] Inventor: Guy C. Anderson, 2048 E. County Road F, White Bear Lake, Minn. 55110
[22] Filed: Sept. 26, 1975
[21] Appl. No.: 616,925
[52] U.S. Cl. .................................................. 43/85
[51] Int. Cl.$^2$ ....................................... A01M 23/34
[58] Field of Search ................................ 43/85, 81
[56] References Cited
UNITED STATES PATENTS
3,161,984  12/1964  Martin ................................... 43/85
FOREIGN PATENTS OR APPLICATIONS
663,126  12/1951  United Kingdom ................... 43/85

Primary Examiner—G.E. McNeill
Assistant Examiner—Daniel J. Leach
Attorney, Agent, or Firm—Jacobson and Johnson

[57] ABSTRACT

An improved animal trap is provided in which a movable jaw is held in the set position and a trigger mechanism activated by entrance of an animal into the trap causes release of a latch member to allow a movable jaw to sharply and quickly strike the animal within the trap. The movable jaw whips rapidly into the animal generally causing immediate death of the animal by a sharp blow on the neck of the animal.

4 Claims, 6 Drawing Figures

HUMANE ANIMAL TRAP

BACKGROUND OF THE INVENTION

1. Field of the Invention.

This invention relates generally to traps and, more specifically, to an animal trap which humanely and swiftly kills an animal that comes into the jaws of the trap.

2. Description of the Prior Art

The art of trapping small game animals for fur is an old art which few people follow today. However, there are nevertheless, two distinct groups of trappers: the first group is the professional who catches small animals for their fur; the second group is the average citizen who uses a trap to rid himself of a pest. One of the basic traps used for the trapping of animals is the leg hold trap in which the animal's leg is caught in the trap. This trap has certain disadvantages and certain advantages. Among the disadvantages of the leg hold trap is that it does not kill the animal, but only holds the animal until the trapper kills the animal. Consequently, the animal in a leg hold trap may struggle and be attacked by other predators who may damage or ruin the pelt as well as allowing the animal to suffer until he dies, or is killed. Nevertheless, these leg hold traps have certain applications because there are certain animals that cannot be trapped by any other trap. An example is the fox which is very wary and is almost impossible to catch with any trap except a leg hold trap.

Other types of prior art traps which have some type of spring action and a bar for striking the animal are shown in the Dahlgren U.S. Pat. No. 3,534,493 in which a bar on the top of the trap is forced downward toward a flat jaw located on the bottom of the trap. Another type of prior art trap is shown on the Purlee U.S. Pat. No. 2,542,942 in which a serrated jaw is brought down on the animal. Still another type of trap is shown on the Conibear U.S. Pat. No. 3,010,245 which has a pair of spring-loaded jaws that can choke an animal to death. Still other types of traps utilize members that have jaws to clamp around the animal or prongs to impale the animal. However, these prior art traps are not entirely effective in swiftly and humanely killing an animal.

The present invention, in contrast, provides a trap which is light weight, can be carried and stored easily and contains a movable jaw which is powered upward upon release of the trigger to quickly and almost instantaneously kill the animal by a sharp blow on the neck. The trigger mechanism is such that it is virtually impossible for the animal to get more than his head into the trap before the jaw hits him.

SUMMARY OF THE INVENTION

The present invention comprises a light weight animal trap for swiftly and humanely killing an animal by a sharp blow on the neck. The trap is sufficiently compact so as to be easily carried by a trapper while making the rounds of his trapline. The operable parts of the trap include a first jaw and a second movable jaw which coact to define an opening for an animal to pass through. A trigger mechanism is located in the opening outlined by the first and second jaws. When an animal enters the trap, the animal's body rotates the trigger finger mechanism causing the release of the movable jaw which whips into the animal's neck in a scissoring like action. This action almost always produces instantaneous death of the animal.

BRIEF DESCRIPTION OF THE DRAWING

Referring to the drawing.

DESCRIPTION OF THE PREFERRED EMBODIMENT

Figure 1:
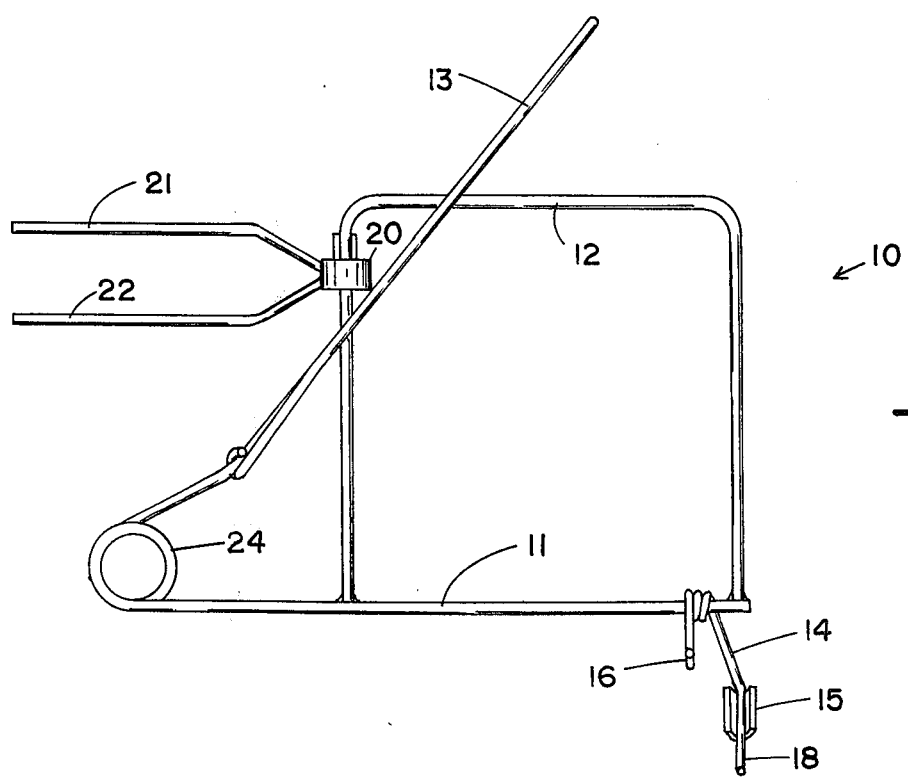
FIG. 1 shows a front view of a trap in a sprung position.
Figure 4:
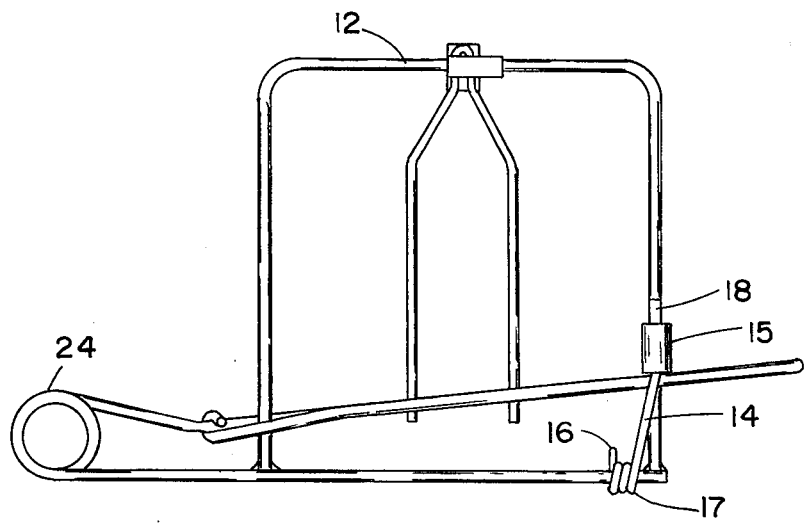
FIG. 4 shows a front view of the trap in a storage position.

Referring to FIG. 1, reference numeral 10 generally designates the trap of my invention which comprises a base member 11, a first U-shaped stationery jaw 12 which is fastened to base member 11 by welding or by hooking the end of jaw 12 around jaw 11. A double bar movable jaw 13 is connected to base member 11 through a coil spring 24. Typically, base member 11, coil spring 24 and movable jaw 13 are made up of the same material and comprise a single unit. The double bar on movable jaw 13 allows stationery jaw 12 to function as a guide for directing jaw 13 in the desired direction.

Figure 3:
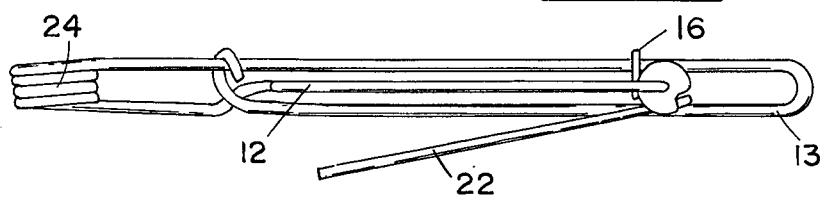
FIG. 3 shows a top view of the trap in a set position.
Figure 2:
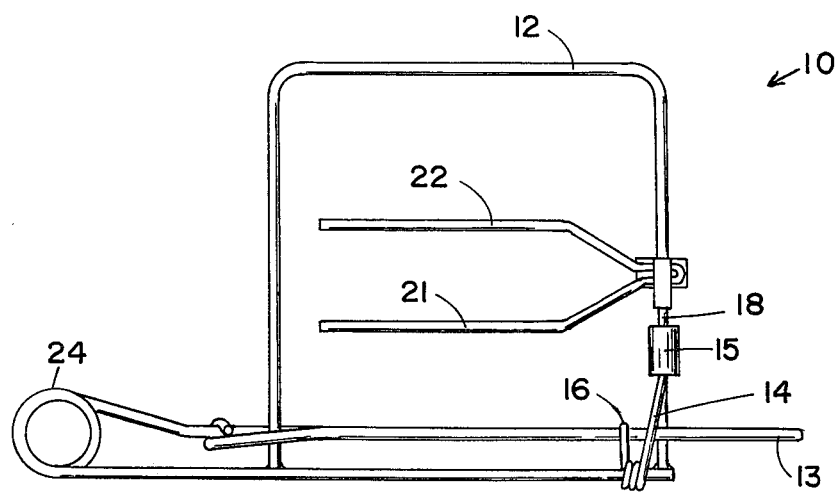
FIG. 2 shows the front view of the trap in a set position.

A rotatable latch member 14 is rotatably mounted on the lower portion of base member 11. Located on one end of latch member 14 is a hook 16 for engaging and holding movable jaw 13 is a set position. On the other end of latch member 14 is a guide or shoe 15 that fits around a portion of jaw 12. Located on top of guide 15 is a round pin 18 that forms releasable engagement with a trigger mechanism 20. When hook 16 is connected to movable jaw 13 and when latch mechanism 14 is in the upright position so that shoe 15 engages jaw 12, movable jaw 13 is held in the set position as long as shoe 15 is held against jaw 12 (FIG. 2). To hold latch member 14 in an upright position, there is provided a triggering mechanism (FIG. 5 and FIG. 6) comprising a slidable rotatable cam housing 20 and a pair of trip fingers 21 and 22 that project into the space outlined by stationery jaw 12 and movable jaw 13 when movable jaw 13 is in the set position as shown in FIG. 2.

Figure 5:
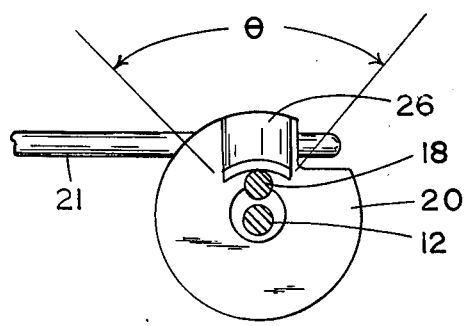
FIG. 5 shows the details of the trigger mechanism of the trap.
Figure 6:
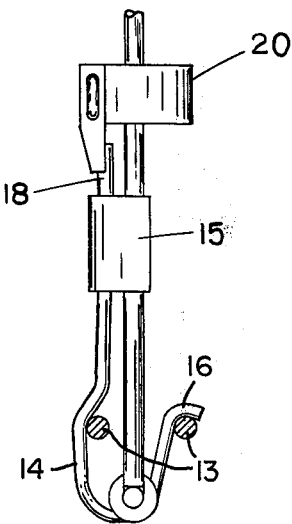
FIG. 6 shows an end view of the latching member for holding the power jaw of the trap in a set position.

Trip fingers 21 and 22 are rigidly connected to cam housing 20 so that rotation of trip fingers 21 and 22 also rotates cam housing 20. Located on cam housing 20 is a cam 26 that projects outward from cam housing 20 (FIG. 5 and FIG. 6) to form engagement with pin 18. Referring to FIG. 5, an angle $\theta$ is defined by the edges of the cam and a point of rotation of housing 20 about jaw 12. In the set position, as shown in FIG. 2, pin 18 would be located in the center of cam 26 as shown in FIG. 5. Thus, a rotation of $\theta/2°$ will cause cam 26 to disengage from pin 18. Typically, I have found that with $\theta2°$ of about 40°, the trap will consistently catch the animal in the neck. When cam 26 disengages pin 18, the spring force of movable jaw 13 on hook 16 causes latch member 14 to rotate downward, thus releasing hook 16 and freeing movable jaw 13 to slide upward along stationery jaw 12. As movable jaw 13 slides upward along stationery jaw 12, it also slides cam housing 26 upward and around jaw 12.

In operation of trap 10, a trapper places trap 10 in the set position (FIG. 2) and perpendicularly to the animal runway. In the set position, trip fingers 21 and 22 extend into the opening defined by jaw 12 and movable jaw 13. With trap 10 set perpendicular to the animal runway, the trap can be triggered by an animal coming from either direction in the runway. As the animal enters the trap, the animal rotates the trigger fingers and cam housing 20 around jaw 12. When trigger fingers 21 and 22 rotate $\theta/2°$ of about 40°, it has been found that for small animals such as mink, muskrat, etc., the trap instantly kills the animal with a sharp blow to the neck.

I claim:
1. A lightweight animal trap for swiftly and humanely killing an animal, said trap being sufficiently compact for ease in carrying by a trapper while making the rounds of his trap line, said lightweight animal trap comprising:
   a base member;
   a first jaw connected to said base member so as to coact with said base member and outline an opening which an animal can enter;
   a second movable jaw;
   a spring connected to said movable jaw and said base member for powering said movable jaw toward said first jaw when said second movable jaw is in a set position;
   said spring, said base member and said second movable jaw comprised of a continuous member with said spring located intermediate said base member and said movable jaw, said spring being spaced from the opening in said trap so that said movable jaw transverses the opening in said trap;
   means for holding said movable jaw in a set position, said means including a latch member having one end for engaging said movable jaw and a second end for engaging said first jaw, further means on said latch member for releasably engaging a trigger mechanism;
   a triggering mechanism, said triggering mechanism comprising a trigger finger for projecting into the opening in the trap where an animal can enter; said triggering mechanism including a rotatable cam member slidably mounted on said first jaw, said trigger finger connected to said rotatable member, said rotatable member operable to hold said latch member in a stable position when said trigger finger is in a set position so that when an animal enters the opening in the trap, the animal rotates said triggering mechanism thereby releasing said latch member so that said movable jaw is freed to swiftly swing toward said first jaw in a scissoring action capable of instantly killing an animal located in the opening of the trap.
2. The invention of claim 1 wherein said latch member includes a shoe for engaging said first jaw.
3. The invention of claim 2 wherein said latch member includes a pin for engaging said cam member.
4. The invention of claim 3 wherein said cam member has an included angle $\theta$ of about 80°.

* * * * *